United States Patent
Morin et al.

(10) Patent No.: US 9,222,555 B2
(45) Date of Patent: Dec. 29, 2015

(54) LINEAR ACTUATOR

(75) Inventors: Jesse Morin, Westbrook, ME (US);
Edmund McHugh, Longford (IE);
Michael Hanes, Limerick, ME (US)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 647 days.

(21) Appl. No.: 13/567,304

(22) Filed: Aug. 6, 2012

(65) Prior Publication Data

US 2014/0033842 A1 Feb. 6, 2014

(51) Int. Cl.
| | |
|---|---|
| *F16H 19/04* | (2006.01) |
| *E21B 41/00* | (2006.01) |
| *F16K 31/04* | (2006.01) |
| *F16H 37/04* | (2006.01) |
| *F16H 35/00* | (2006.01) |
| *F16H 1/16* | (2006.01) |
| *F16H 1/46* | (2006.01) |

(52) U.S. Cl.
CPC ............... *F16H 19/04* (2013.01); *E21B 41/00* (2013.01); *F16H 37/041* (2013.01); *F16K 31/047* (2013.01); *F16H 1/16* (2013.01); *F16H 1/46* (2013.01); *F16H 2035/005* (2013.01); *Y10T 74/18568* (2015.01); *Y10T 74/18808* (2015.01)

(58) Field of Classification Search
CPC . F16H 19/04; F16H 37/041; F16H 2035/005; E21B 41/0007; F16K 31/047
USPC ............ 166/335, 368, 373; 74/89.17; 251/89, 251/248
See application file for complete search history.

(56) References Cited

U.S. PATENT DOCUMENTS

| | | | | | |
|---|---|---|---|---|---|
| 3,505,888 | A | * | 4/1970 | Denkowski | ................... 74/89.27 |
| 3,524,526 | A | * | 8/1970 | Denkowski | .................... 192/141 |
| 3,949,626 | A | * | 4/1976 | Berlinger et al. | .................. 475/7 |
| 4,429,592 | A | * | 2/1984 | Stevenson | ........................ 74/625 |
| 4,616,528 | A | * | 10/1986 | Malinski et al. | ................... 475/4 |
| 4,616,803 | A | * | 10/1986 | Schils | ............................. 251/14 |
| 4,760,989 | A | * | 8/1988 | Elliott et al. | ............. 251/129.03 |
| 4,896,562 | A | * | 1/1990 | Wilkinson et al. | ................. 475/3 |
| 4,994,001 | A | * | 2/1991 | Wilkinson et al. | ................. 475/4 |
| 5,063,808 | A | * | 11/1991 | Hill | .............................. 74/411.5 |

(Continued)

FOREIGN PATENT DOCUMENTS

| | | | | |
|---|---|---|---|---|
| CA | 2800591 | | 1/2012 | |
| WO | WO 2010065210 A1 | * | 6/2010 | .............. E21B 41/02 |

OTHER PUBLICATIONS

Thomas, International Search Report and Written Opinion for PCT/US2013/053354, mailed Dec. 16, 2013.

*Primary Examiner* — Matthew Buck
(74) *Attorney, Agent, or Firm* — Eubanks PLLC

(57) ABSTRACT

A linear actuator is provided. In one embodiment, the actuator includes a motor, a gearbox, and a linear actuation device. The motor serves as a primary input to provide a rotational input to the gearbox, which generates a corresponding rotational output. The linear actuation device converts the rotational output of the gearbox into a linear motion for driving a load in a linear direction. The actuator includes an override system as a secondary input. The override system may be operated to drive the gearbox in the event that the motor becomes non-operational. Anti-back-driving devices may be provided to prevent back-driving of the motor and of the override system. In the context of a resource extraction system, the motor may be an electric motor powered by subsea electronic control system. Additional systems, devices, and methods are also disclosed.

8 Claims, 14 Drawing Sheets

(56) References Cited

U.S. PATENT DOCUMENTS

| | | | |
|---|---|---|---|
| 5,166,677 A * | 11/1992 | Schoenberg | 340/853.3 |
| 5,836,567 A * | 11/1998 | Watanabe | 251/129.12 |
| 6,393,931 B1 * | 5/2002 | Spangenberg | 74/425 |
| 6,766,709 B1 * | 7/2004 | West et al. | 74/425 |
| 6,845,857 B2 * | 1/2005 | Matsuo et al. | 192/223 |
| 6,953,084 B2 * | 10/2005 | Greeb et al. | 166/66.4 |
| 7,066,301 B2 * | 6/2006 | Oh et al. | 185/40 R |
| 8,277,349 B2 * | 10/2012 | Erhart et al. | 475/2 |
| 8,382,621 B2 * | 2/2013 | Chen | 475/4 |
| 2008/0229851 A1 | 9/2008 | Jones et al. | |
| 2011/0115319 A1 * | 5/2011 | Schade et al. | 310/83 |

* cited by examiner

LINEAR ACTUATOR

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

In order to meet consumer and industrial demand for natural resources, companies often invest significant amounts of time and money in searching for and extracting oil, natural gas, and other subterranean resources from the earth. Particularly, once a desired subterranean resource is discovered, drilling and production systems are often employed to access and extract the resource. These systems may be located onshore or offshore depending on the location of a desired resource.

Further, such systems generally include a wellhead assembly through which the resource is extracted. These wellhead assemblies may include a wide variety of components that control drilling and/or extraction operations. Such components may include one or more production trees (often referred to as "Christmas trees"), control modules, a blowout preventer system, and various casings, valves, fluid conduits, and the like, that generally facilitate the extraction of resources from a well for transport to the surface. As can be appreciated, production trees often include certain elements for flow monitoring and control, such as choke valves (often referred to as a "choke") and flow meters, as well as chemical injection metering valves, various sensors, and so forth.

During the resource extraction process, the flow rate of resources extracted from the well may be regulated using flow control devices, such as a valve. Generally, valves for regulating flow rate are controlled using an actuator. For instance, a choke may include a stem that is designed to be stroked along a linear path between an open position and a closed position using a linear actuator designed to apply a force to drive a load (e.g., the choke stem) in a linear direction. For example, the actuator may control the position of the stem to the open position, the closed position, or to an intermediate position between the open and closed position depending on a desired flow rate. Typically, a maximum flow rate is achieved through the choke when the stem is controlled to the open position, and a minimum flow rate is achieved through the choke when the stem is controlled to the closed position. Additionally, intermediate flow rates may be achieved by controlling the stem to an intermediate position (e.g., one that is between the open and closed positions).

Actuators employed in resource extraction applications typically include an input driving mechanism, such as a hydraulic or electric motor. For example, the motor may provide a rotational force that is used to drive one or more gear sets of the actuator. A linear actuation device may then convert rotary motion generated by the gear set(s) into linear motion for driving a load, such as the stem of a valve, to control flow rate. As can be appreciated, such actuators are typically designed with certain parameters suitable for extreme conditions that are often associated with onshore or offshore resource extraction applications. For instance, in an offshore subsea application, it may be desirable to provide an actuator capable of operating under high pressure conditions, such as several thousand pounds per square inch (PSI) of pressure, and of holding high dynamic thrust loads and static loads (e.g., 20,000 pounds or greater) while also being able to fully stroke a load, such as the stem of a choke valve, from an open position to a closed position within a relatively short amount of time (e.g., 5 to 10 minutes).

Some existing actuators may be capable of meeting such operating conditions, but typically require an amount of power that exceeds that which is available from most conventional subsea electronic control systems. A separate higher power system for providing dedicated power to drive such an actuator may be required, which adds to both the complexity and costs associated with subsea resource extraction. Additionally, some existing actuators may be susceptible to back-driving under certain conditions. For instance, when fluid pressure acting on a stem of a choke is great enough, the stem may be forced from a closed or intermediate position towards the open position. As a result, the gear set(s) and motor of the actuator may experience back-driving, which is generally undesirable.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Embodiments of the present disclosure relate generally to a linear actuator. The linear actuator may be used to apply a linear-directed force to move a load, such as the stem of a valve for controlling flow rate. In one embodiment, the actuator includes a primary input, a secondary input, a gearbox, and a linear actuation device having a rack and pinion. The primary input may be provided by an electric motor that delivers a rotational input to the gearbox. A resulting rotational output from the gearbox turns the pinion, thus lowering or raising the rack, which may be coupled to the load. In the event of failure of the primary input, the secondary input may be used as an override to control the gearbox. The linear actuator further includes anti-back-driving devices associated with both inputs. These anti-back-driving devices permit the gearbox to be forward-driven while preventing each input from being back-driven.

Various refinements of the features noted above may exist in relation to various aspects of the present embodiments. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of some embodiments without limitation to the claimed subject matter.

BRIEF DESCRIPTION OF THE DRAWINGS

These and other features, aspects, and advantages of certain embodiments will become better understood when the following detailed description is read with reference to the accompanying drawings in which like characters represent like parts throughout the drawings, wherein.

DETAILED DESCRIPTION OF SPECIFIC EMBODIMENTS

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not require any particular orientation of the components.

Figure 1:
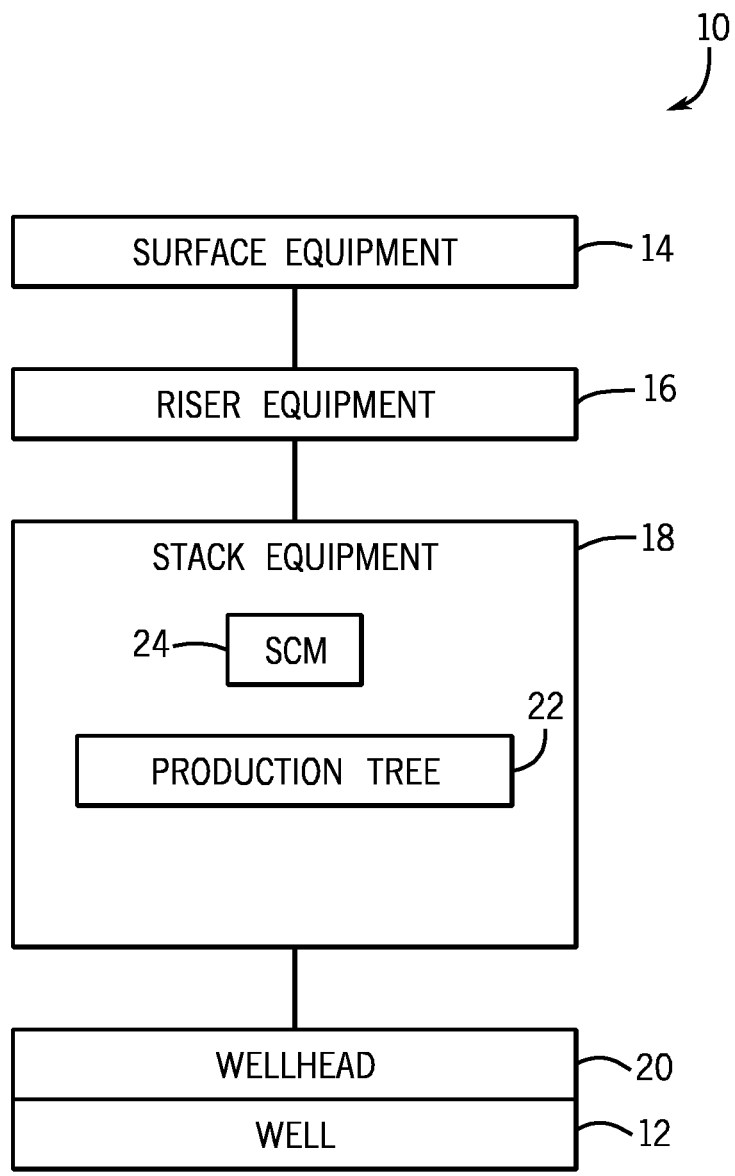
FIG. 1 depicts a resource extraction system that includes a production tree in accordance with one embodiment of the present disclosure.

Referring initially to FIG. 1, an exemplary resource extraction system 10 is illustrated in accordance with an embodiment of the present invention. The system 10 is configured to facilitate the extraction of a resource, such as oil or natural gas, from a well 12. As shown, the system 10 includes a variety of equipment, such as surface equipment 14, riser equipment 16, and stack equipment 18, for extracting the resource from the well 12 by way of a wellhead 20. The system 10 may be used in a variety of drilling or extraction applications. Further, while the system 10 is depicted as an offshore or "subsea" system, it will be appreciated that onshore systems are also available. In the depicted system 10, the surface equipment 14 is mounted to a rig located above the surface of the water, whereas the stack equipment 18 is coupled to the wellhead 20 proximate the sea floor. The surface equipment 14 and stack equipment 18 may be coupled to one another by way of the riser equipment 16.

As can be appreciated, the surface equipment 14 may include a variety of devices and systems, such as pumps, power supplies, cable and hose reels, control units, a diverter, a gimbal, a spider, and the like. Similarly, the riser equipment 16 may also include a variety of components, such as riser joints, fill valves, control units, and a pressure-temperature transducer, to name but a few. The riser equipment 16 may facilitate transmission of extracted resources (e.g., oil and/or gas) to the surface equipment 14 from the stack equipment 18 and the well 12.

The stack equipment 18 of FIG. 1 includes a production tree 22, also commonly referred to as a "Christmas tree," and a subsea control module (SCM) 24. The tree 22 may include components that control the flow of an extracted resource out of the well 12 and upward to the riser equipment 16 which in turn facilitates the transmission of the extracted resource upward to the surface equipment 14, as discussed above. For instance, the tree 22 may include various valves and conduits, a flow meter, sensors, and so forth. In some embodiments, the tree 22 may also provide additional functions, including chemical injection functionality and pressure relief. As will be discussed in further detail below, the tree 22 may include a choke that is controlled using an actuator to help regulate the flow rate of materials extracted from the well 12.

The subsea control module (SCM) 24 provides for electronic and/or hydraulic control of the various components of the stack equipment 18. For example, the SCM 24 may include controller that provides for communication with control equipment at the surface (e.g., part of the surface equipment 12). The controller may receive data acquired by sensors located on the tree 22 and relay such data to surface control equipment. Additionally, the controller may convert electronic commands into hydraulic signals to control hydraulically actuated components within the stack equipment. The SCM 24 may also include power circuitry that receives power from one or more power systems located at the surface. Accordingly, the controller and power circuitry of the SCM 24 may be part of a subsea electronic control system that distributes and supplies electrical power to electronically controlled components of the stack equipment 18. By way of example, such an electronic control system may supply electrical power for powering an alternating current (AC) or direct current (DC) electric motor that drives a linear actuator for controlling a choke valve located on the tree 22. In some embodiments, multiple SCMs 24 may be provided with the stack equipment 18 for redundancy purposes. Further, though not shown explicitly in FIG. 1, some embodiments of resource extraction system 10 may include a blowout preventer system that has one or more ram-type and/or annular blowout preventers. Such a blowout preventer system may be located between the stack equipment 18 and riser equipment 16 and may include multiple ram-type and/or annular blowout preventers, i.e., for redundancy purposes.

Figure 2:
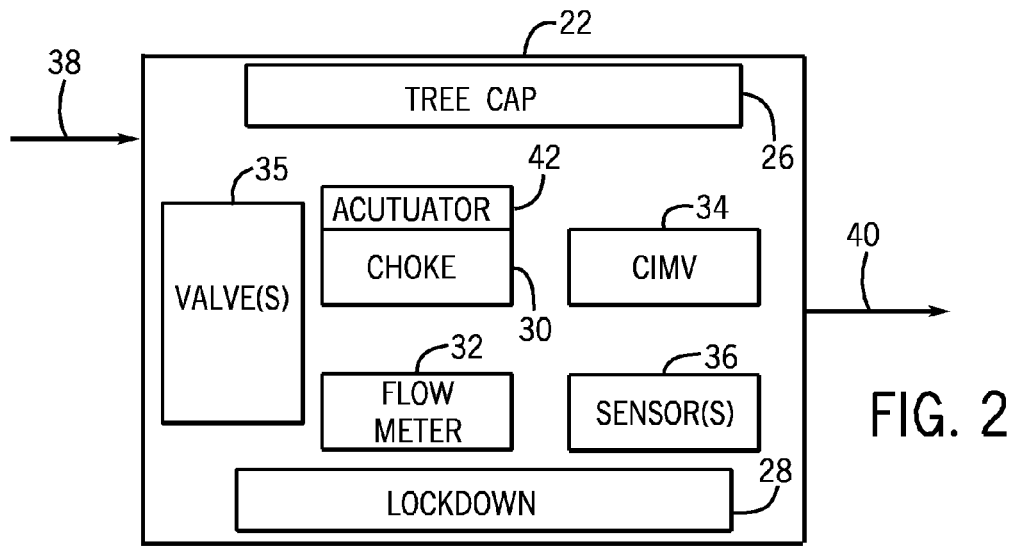
FIG. 2 is a block diagram illustrating a production tree having a choke controlled by a linear actuator in accordance with one embodiment of the present disclosure.

FIG. 2 is a simplified representation of a tree 22 that may be part of the stack equipment 18 depicted in FIG. 1. As shown, the tree 22 includes a tree cap 26, lockdown element 28, choke 30, flow meter 32, chemical injection metering valve(s) 34, safety valve(s) 35, and sensor(s) 36. Typically, the lockdown element 28, which may include one or more clamping devices, secures the tree 22 onto the wellhead 20. The tree cap 26 provides an access point through which components of the tree 22 may be accessed for servicing and/or commissioning. In some embodiments, the tree 22 may include a water injection tree, a gas injection tree, a manifold assembly, or a process module.

Resources extracted during operation of the system 10 may enter the tree 22 via a conduit 38 and flow through various components of the tree 22. For example, resources extracted from the well 12 may flow through the choke 30 which is used to control the flow rate of the resources as they are directed upwards to the riser equipment 16 and surface equipment 14 via a conduit 40. The flow meter 32 may be fluidly coupled to the choke 30 and may include a multiphase flow meter for measuring characteristics of individual phase flow rates during resource extraction. For example, a multiphase flow meter 32 may measure flow rates of oil, water, and gas mixtures extracted from the well 12. In other embodiments, the flow meter 34 may also include a wet gas flow meter configured to measure flow rates of constituents of a wet gas flow. As shown in the illustrated embodiment, the tree 22 also includes at one or more safety valves 35, such as a primary safety valve and secondary safety valve, which may be operated to shut off the well, such as in the case of emergency situations or for maintenance purposes. In one embodiment, the safety valves 35 include gate valves.

In the illustrated embodiment, the tree 22 includes one or more chemical injection metering valves 34 used to provide for the injection of chemicals in resource extraction applications. For instance, certain chemicals, such as low-dose hydrate inhibitors, may be introduced into the flow of the extracted resources from the well 12 at one or more chemical injection points. This may help prevent blockages and/or corrosion, which improves production output and extends the operational life of the resource extraction system 10.

The sensors 36 of the tree 22 may include an arrangement of multiple sensors for acquiring various types of data points relating to resource extraction. For example, the illustrated sensors 36 may include one or more of pressure and temperature transducers, acoustic sand detection sensors, and sand erosion/corrosion monitoring sensors. As will be appreciated, each of these components may provide operational data to the SCM 24, which may further relay this data to surface control equipment. In one embodiment, the sensors 36 further include a choke position indicator that provides information relating to the stem position of the choke 30. As shown in FIG. 2, the stem position of the choke 30 may be controlled using a linear actuator 42.

Figure 3:
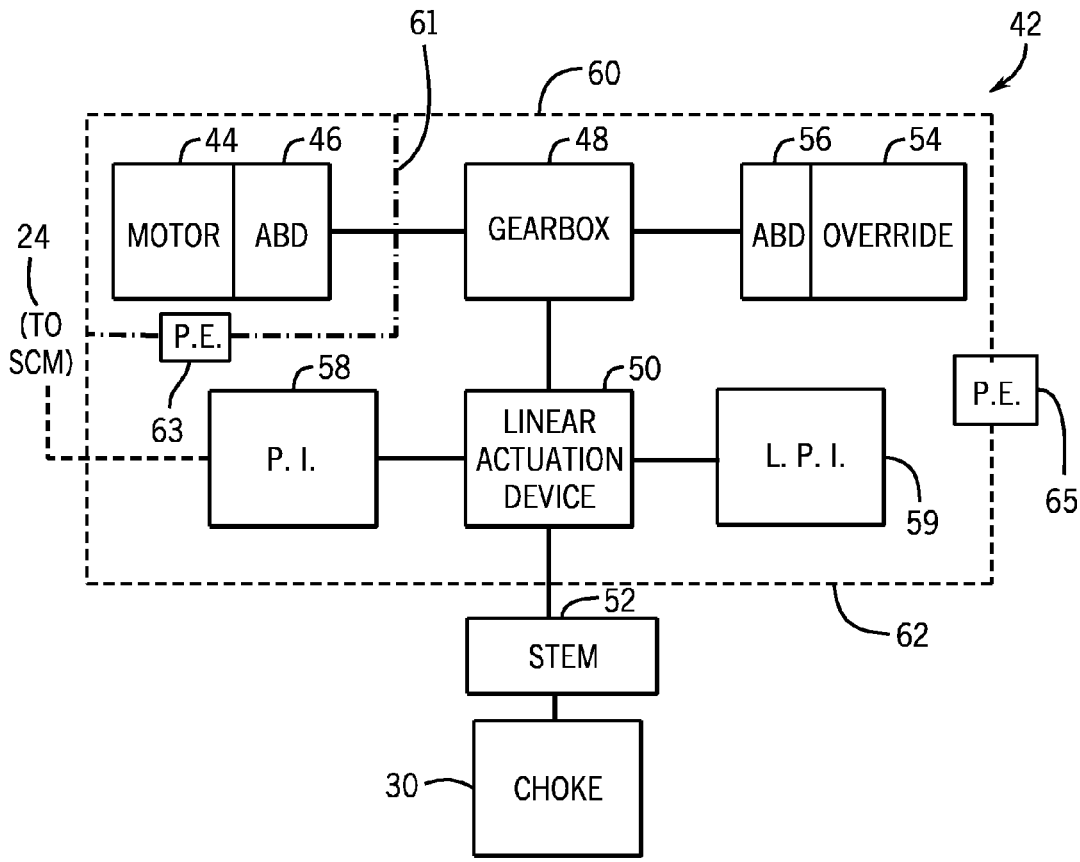
FIG. 3 is a block diagram illustrating components of the linear actuator shown in FIG. 2 in accordance with one embodiment of the present disclosure.

FIG. 3 provides a simplified representation of such an actuator 42 in accordance with one embodiment. As shown, the actuator 42 includes a motor 44, a first anti-back-driving device 46, a gearbox 48, and a linear actuation device 50. The motor 44 serves as a primary input and may include a hydraulic motor or an electric motor. The gearbox 48 may be a reduction gearbox that is driven by a rotational input provided by the motor 44. For example, the rotational input from the motor 44 may turn a shaft that drives one or more reduction gear sets contained within the gearbox 48. The linear actuation device 50 converts the resulting rotational output of these gear sets into a linear motion that may be used drive a load, shown here as being a stem 52 of the choke valve 30. That is, linear motion, as provided by the linear actuation device 50, moves the stem along a linear path to a desired position. Accordingly, depending on the direction of the linear motion applied, the stem 52 may be raised or lowered to control a flow rate through the choke 30.

The anti-back-driving device 46 generally functions to permit an input to drive an output, which is sometimes referred to as forward-driving, while simultaneously preventing the output from driving the input, which is sometimes referred to as back-driving. In the present embodiment, the motor 44 may be considered as an input with respect to the anti-back-driving device 46 while the components driven by the motor 44 (e.g., gearbox 48, linear actuation device 50, and stem 52) are considered the output. For example, the anti-back-driving device 46 permits the rotational input from the motor 44 to turn a shaft to drive the gearbox 48, which in turn drives the linear actuation device 50 to vary the position of the stem 52. However, the anti-back-driving device 46 also prevents forces originating from the output to back-drive the motor 44. This type of operation is sometimes referred to as directional locking.

For example, consider a condition where fluid pressure acting against the stem 52 is sufficient such that it would normally cause the stem 52 to raise. Without the anti-back-driving device 46, linear motion resulting from the raising of the stem 52 due to fluid pressure may be translate back to the motor 44 as a rotational force, resulting in back-driving of the motor 44. This is typically undesirable. Accordingly, the anti-back-driving device 46 insulates the motor 44 from experiencing such back-driving. By way of example only, in one embodiment, the anti-back-driving device 46 of FIG. 3 may be a model of an Irreversible Lock IR device available from Ringspann GmbH of Bad Homburg, Germany.

As further shown in FIG. 3, the actuator 42 also includes an override system 54 and a second anti-back-driving device 56. The override 54 essentially functions as a secondary input that may be used to control the position of the stem 52 of the choke 30 if the motor 44 (e.g., the primary input) is unable to drive the gearbox 48. For instance, in the event that the motor 44 becomes non-operational, such as due to a malfunction, damage, or loss of power (in the case of an electric motor), the override 54 may be engaged to drive the gearbox 48 and linear actuation device 50 to control the position of the stem 52. The override 54 may be engaged manually (e.g., using a suitable tool or equipment under the control of an operator). For example, in a subsea application, a remotely operated vehicle (ROV) may be used to manually operate the override 54 to bring the stem 52 to a desired position if the motor 44 is non-operational.

The second anti-back-driving device 56 may function in a manner similar to the first anti-back-driving device 46 described above. That is, while the anti-back-driving device 56 permits an input from override 54 to drive the gearbox 48 and linear actuation device 50 to control the position of the stem 52, the anti-back-driving device 56 also prevents these components from back-driving the override 54. Further, the motor 44 and the override system 54 may be de-coupled from the gearbox 48 during operation by way of the anti-back-driving devices 46 and 56, respectively. This allows either the motor 44 or the override 54 to work independently with respect to one another. By way of example only, in one embodiment, the override system 54 may include a model of a MAXTORQUE™ worm gear having anti-back-driving capabilities, available from Cameron International Corporation of Houston, Tex. While specific examples of anti-back-driving devices are provided herein as the devices 46 and 56 of FIG. 3 by way of example only, it should be understood that any suitable type of device that achieves the above-described functionality (e.g., directional locking to permit forward-driving while preventing back-driving). For instance, though depicted in the present embodiment as different models of available anti-back-driving devices, in other embodiments the anti-back-driving devices 46 and 56 may both be of the same or similar model (e.g., the devices 46 or 56 may both be of a model manufactured by Ringspann GmbH, by Cameron International Corporation, or by another manufacturer of these types of devices).

The linear actuator 42 additionally includes a position indicator sensor 58 that provides information regarding the position of the stem 52 to the SCM 24. For example, position indicator sensor 58 may be one of the sensors 36 of FIG. 2. In one embodiment, the position indicator sensor 58 includes a linear variable differential transformer (LVDT). Additionally, the linear actuator 42 includes a local position indicator 59. This local position indicator may include a pointer with a scale to indicate stem position, and may be positioned adjacent the linear actuation device 50. Further, the various components of the linear actuator 42 may be enclosed within a housing 60.

In the present embodiment, the housing 60 includes a first portion 61 that houses the motor 44 and the anti-back-driving device 46, while a second portion 62 houses the gearbox 48 and other components. The motor housing 61 may contain a lubricating fluid, such as gear oil, of relatively light viscosity. This allows for the motor 44 to operate well in high pressure and low temperature environments, as is typically the case in subsea applications. The housing portion 62 may contain a higher viscosity gear oil relative to that of the motor housing 61. To equalize pressure between the low viscosity gear oil and the high viscosity gear oil, a pressure equalization device 63 is provided. Additionally, a second pressure equalization device 65 is provided between the housing portion 62 and the exterior of the housing 60. In the case of a subsea linear actuator, the pressure equalization device 65 equalizes pressure between the high viscosity gear oil and sea water. Additional detail of the housing 60 will be described in more detail below with reference to FIGS. 15 and 16.

Figure 4:
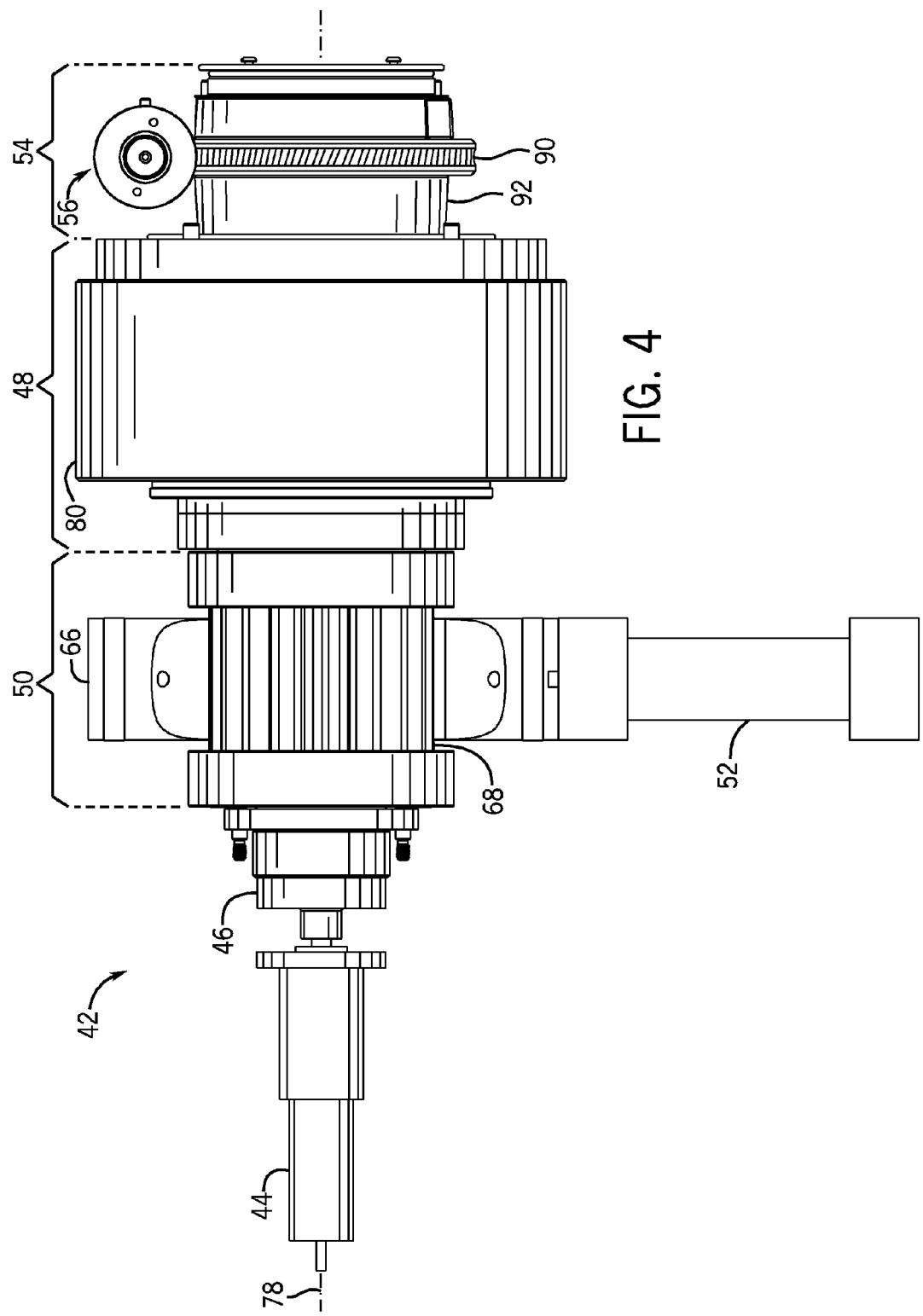
FIG. 4 is a side elevational view of the actuator shown in FIG. 3 in accordance with one embodiment of the present disclosure.
Figure 5:
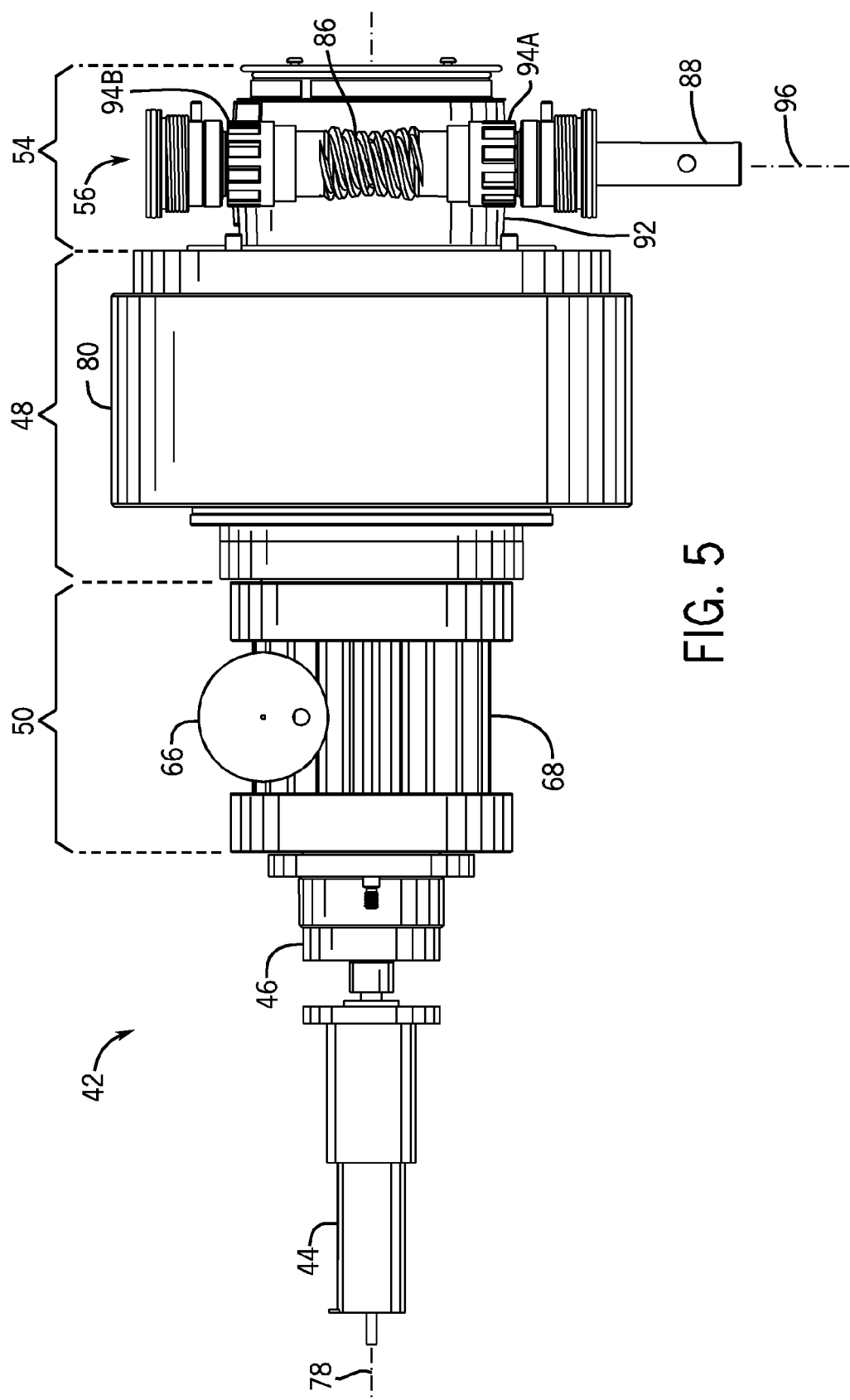
FIG. 5 is a top plan view of the linear actuator depicted in FIG. 4.
Figure 6:
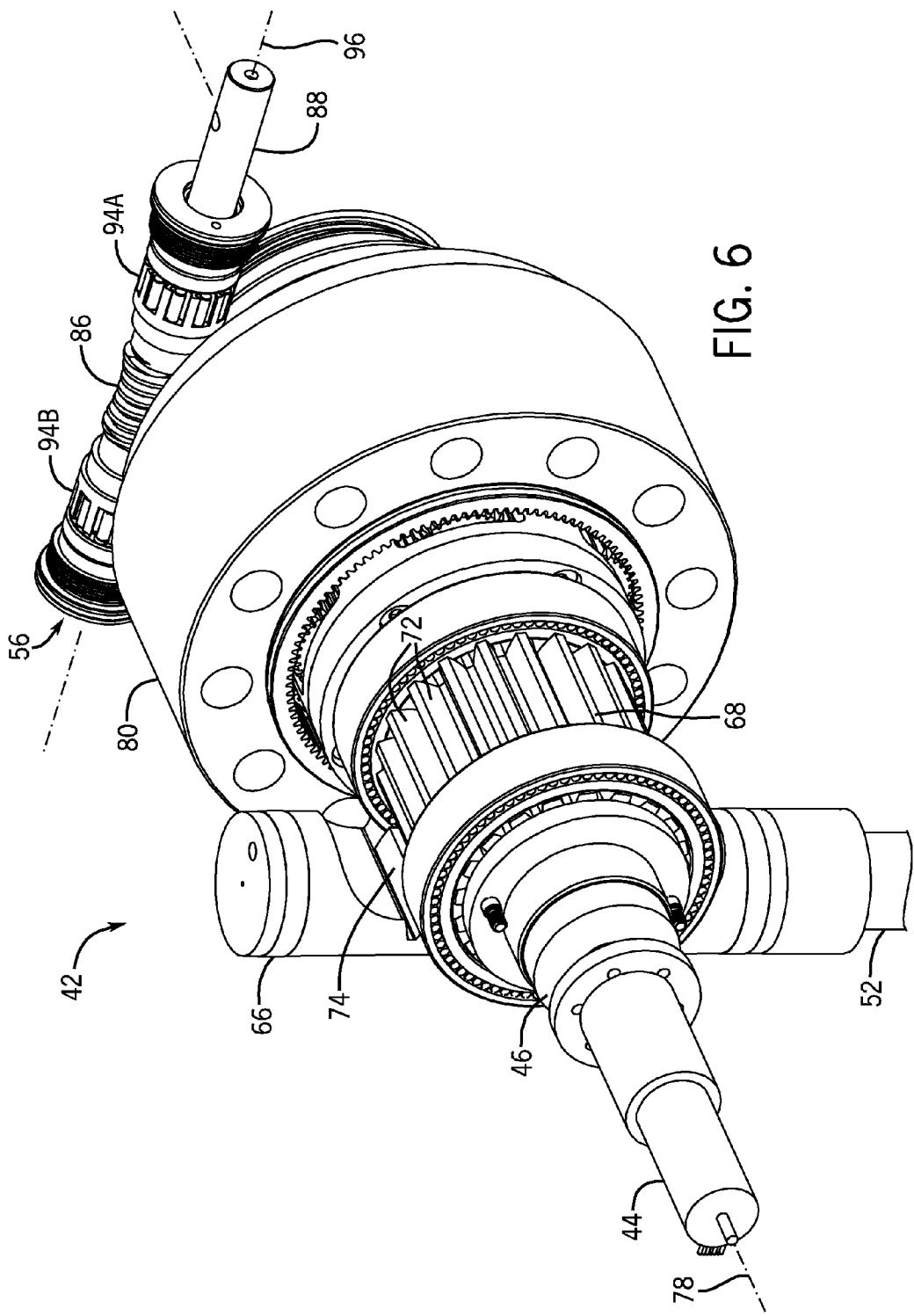
FIG. 6 is a perspective view of the linear actuator depicted in FIG. 4.
Figure 7:
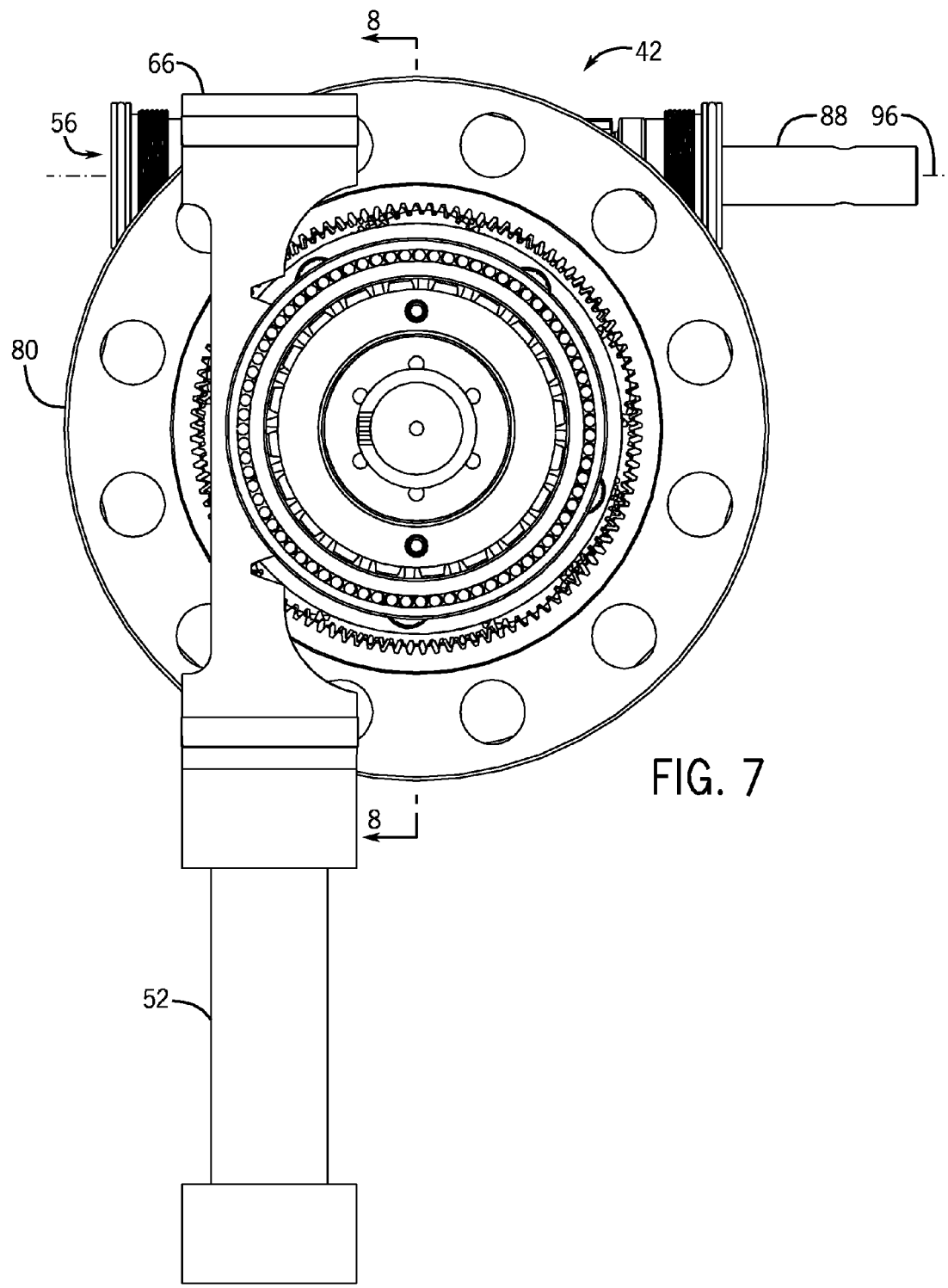
FIG. 7 is a front elevational view of the linear actuator depicted in FIG. 4.
Figure 8:
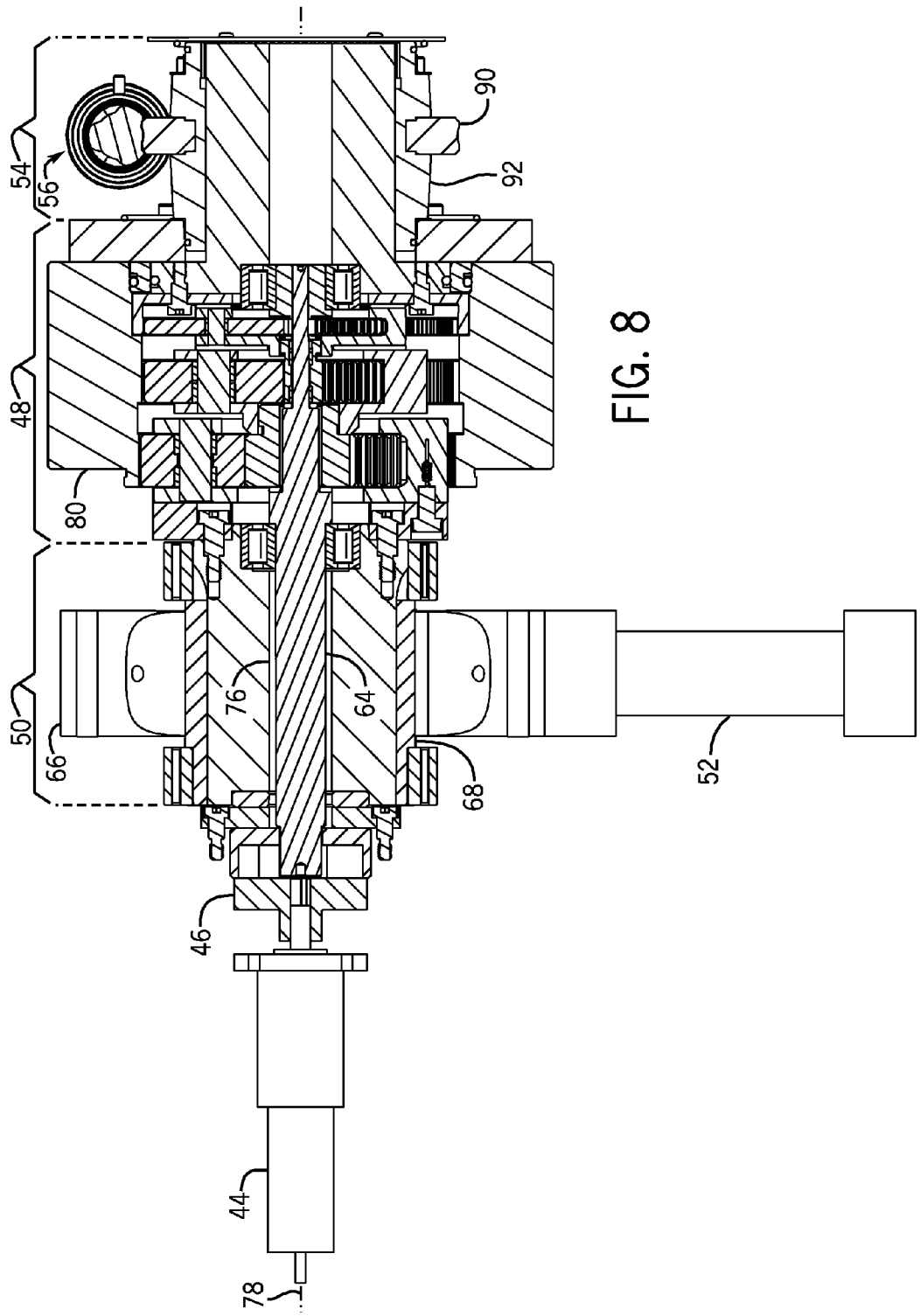
FIG. 8 is a cross-sectional view of the linear actuator depicted in FIGS. 4 to 7 taken through cut-line 8-8 of FIG. 7 in accordance with one embodiment of the present disclosure.
Figure 13:
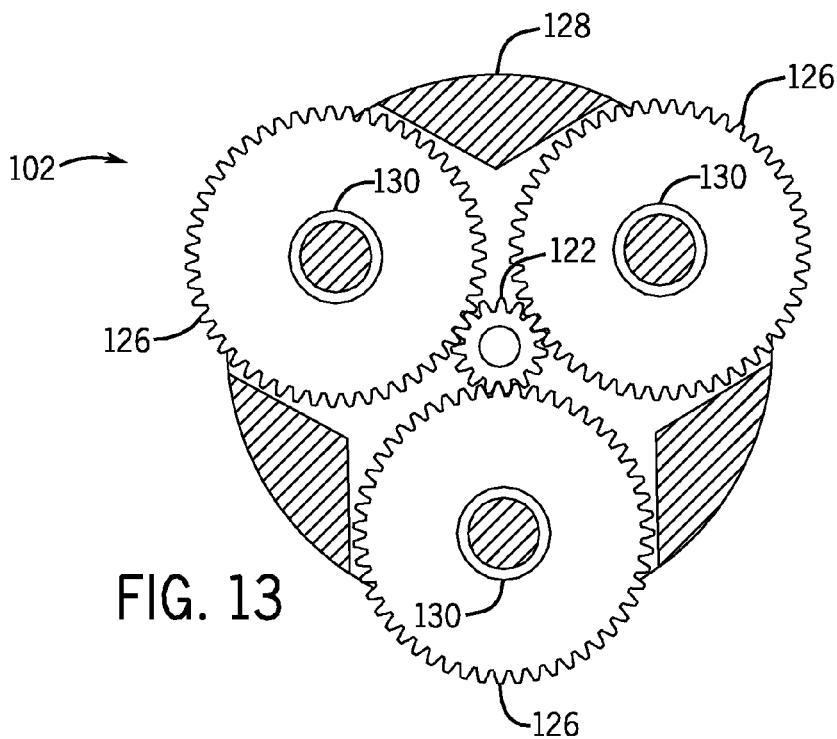
FIG. 13 is a cross-sectional view of a second gear set taken through cut-line 13-13 of FIG. 11 in accordance with an embodiment of the present disclosure.
Figure 14:
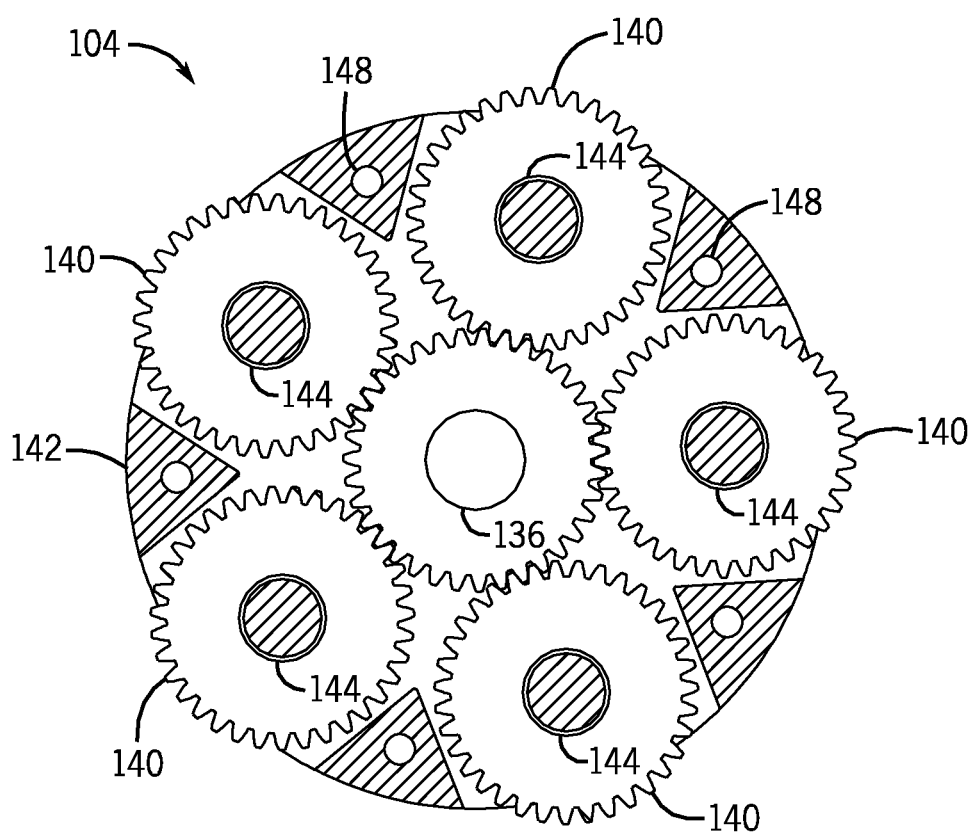
FIG. 14 is a cross-sectional view of a third gear set taken through cut-line 14-14 of FIG. 11 in accordance with an embodiment of the present disclosure.
Figure 15:
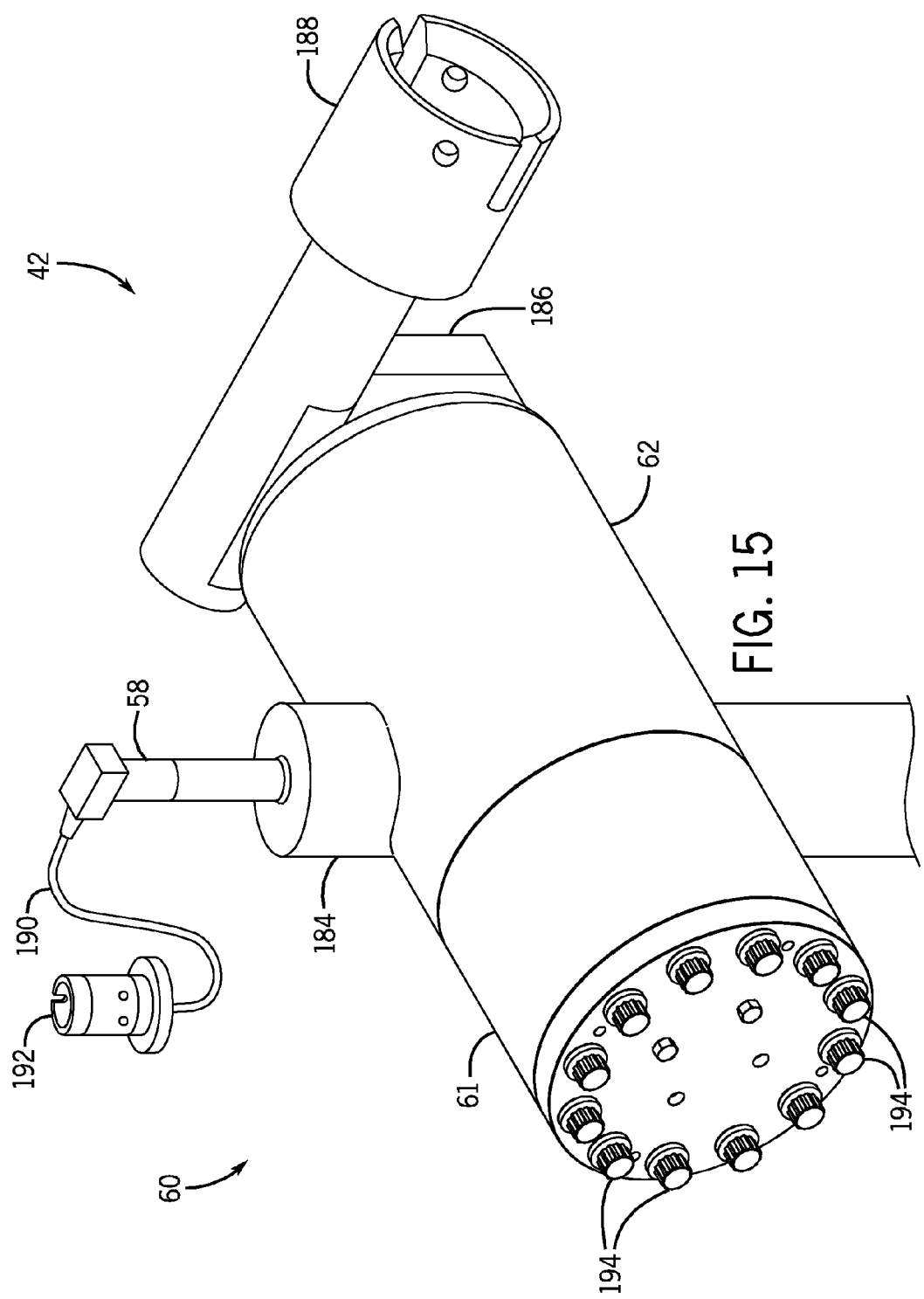
FIG. 15 shows the linear actuator depicted in FIGS. 4 to 7 disposed in a housing in accordance with one embodiment of the present disclosure.
Figure 16:
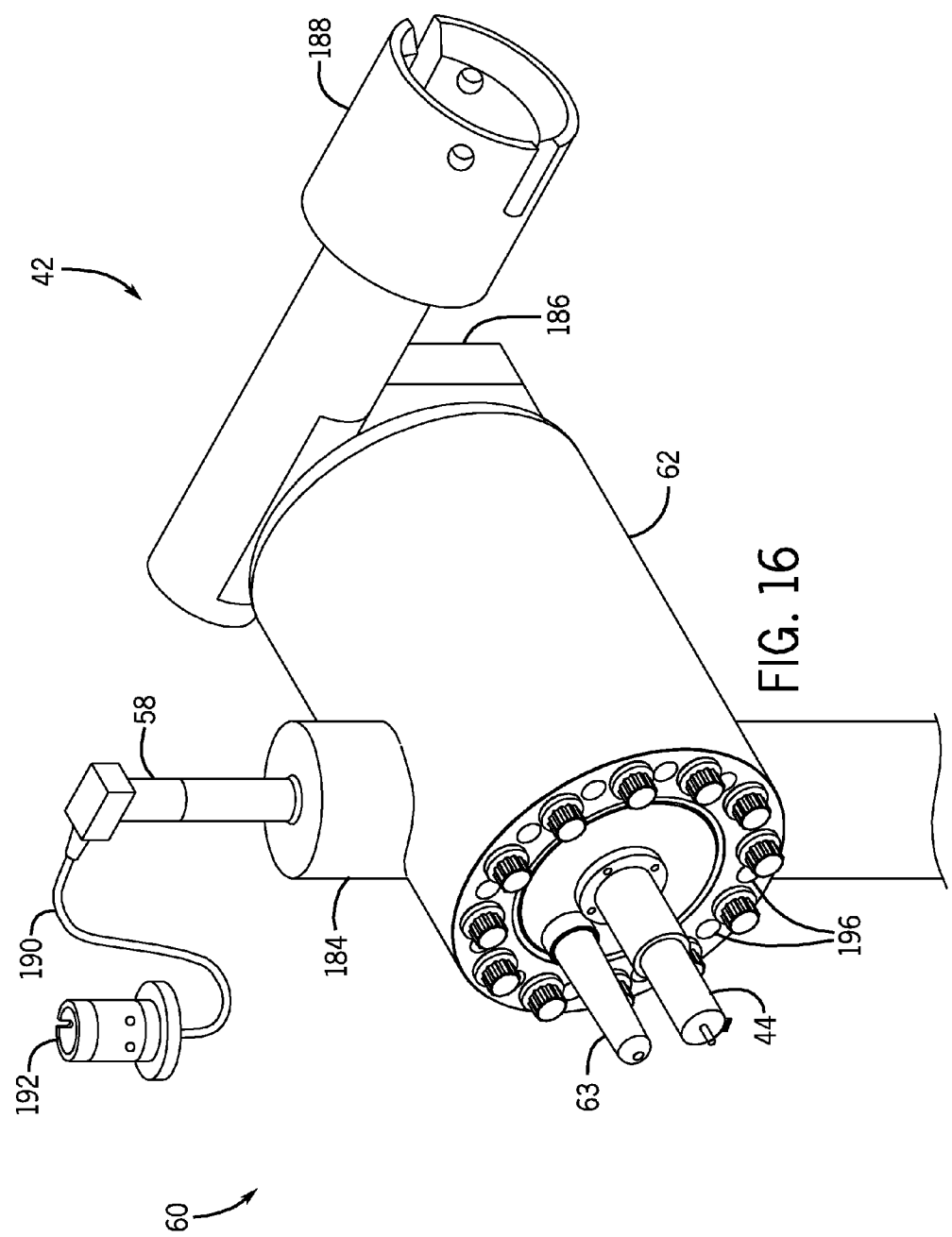
FIG. 16 shows the housed linear actuator, as depicted in FIG. 15, but with a portion removed to expose a motor of the linear actuator, in accordance with one embodiment of the present disclosure.

Having provided a general overview of the linear actuator 42 with reference to FIG. 3, FIGS. 4 to 8 show more detailed views of the linear actuator 42 in accordance with one embodiment. Specifically, FIG. 4 shows a side elevational view, FIG. 5 shows a top plan view, FIG. 6 shows a perspective view, and FIG. 7 shows a front elevational view of the linear actuator 42. Further, FIG. 8 depicts a cross-sectional view of the actuator 42 taken through cut-line 8-8 of FIG. 7. Moreover, it should be noted that FIGS. 4 to 8 are intended to provide a general overview of the operation of the linear actuator 42. FIGS. 9 to 14 provide more specific details regarding the components of the gearbox 48 and the override system 54. Finally, FIGS. 15 and 16 show the housing 60 of the actuator 42 in more detail, as discussed above with reference to FIG. 3.

Keeping these points in mind and with concurrent reference to FIGS. 4 to 8, the linear actuator 42 includes a motor 44 that serves as a primary input for the actuator 42. In the illustrated embodiment, the motor 44 includes an electric motor and may be powered using power provided by a subsea electronic control system that supplies electrical power to electronically controlled components within the stack equipment 18 or by a dedicated power source (e.g., one that is separate from the subsea electronic control system). By way of example only, in one embodiment, the motor 44 may be operated using as little as 48 watts or less of electrical power provided by a subsea electronic control system while achieving a full stroke of the stem 52 within a time period of between approximately 5 and 10 minutes, a full stroke being between approximately 2 to 4 inches. In other embodiments, the motor may achieve a distance of greater than 4 inches within such a time period, or within a lesser or greater time period.

Keeping these example parameters in mind, in other embodiments, higher wattage power systems, which could include a separate dedicated power supply in some cases, may enable to the motor 44 to achieve a full stroke of the stem 52 in approximately one minute or less. Such a power supply may provide 200 watts or more of power. Further, in some embodiments, the power supplied to the motor 44 may vary during operation, which may allow the motor 44 to operate at variable speeds.

The linear actuator 42 includes a shaft 64, which is best shown in FIG. 8. The shaft 64, which is mechanically coupled to the motor 44 by way of the anti-back-driving device 46, may drive the gearbox 48 in response to an input from the motor 44. For instance, a rotational input provided by the motor 44 will cause the shaft 64 to rotate and drive the gearbox 48, which generates its own rotational motion. The gearbox 48 is mechanically coupled to the linear actuation device 50, which is shown in FIGS. 4 to 8 as including a rack 66 and pinion 68, the combination of which converts rotational motion into linear motion. Specifically, the gearbox 48 is mechanically arranged to rotate the pinion 68 when driven by the shaft 64. Because the teeth 72 of the pinion 68 are meshed with teeth 74 of the rack 66, as the pinion 68 rotates, it raises or lowers the rack 66 depending on the direction of rotation (e.g., clockwise or counter-clockwise). The meshing of the teeth of the rack 66 and pinion 68 is best shown in FIG. 6.

In the present embodiment, the shaft 64 is arranged coaxially with respect to a cylindrical bore 76 that extends through the center of pinion 68, as best shown in the cross-sectional view provided in FIG. 8. The bore 76, which is centrally aligned with an axis of rotation 78, has a diameter that is greater than that of the portion of the shaft 64 passing therethough. This allows the shaft 64 to rotate independently of the pinion 68. During operation of the linear actuator 42 via the primary input, the motor 44 provides a rotational input that causes the shaft 64 to rotate. The rotation of the shaft 64 drives the gearbox 48, which in turn rotates the pinion 66 and causes the rack 68 to raise or lower depending on the direction of rotation, as discussed above.

As shown best in FIG. 8, the gearbox 48 includes multiple gear sets arranged coaxially within a ring-shaped sleeve 80. The gear sets may be mechanically arranged such that the shaft 64 drives a first gear set, which in turn drives the remaining gear sets. In this manner, the gearbox 48 provides a rotational output that causes the pinion 68 to rotate. In the illustrated embodiment, the gearbox 48 may be a reduction gearbox. That is, the output directly driven by the gearbox 48, here the pinion 68, rotates at a slower speed than the shaft 64 acting as the input to the gearbox 48. By way of example, the cumulative gear reduction ratio of the gearbox 48 may be determined based on the respective gear reduction ratio for each gear set. A more detailed description of the gear sets contained within the gearbox 48 and the operation thereof is provided below with reference to FIGS. 9 to 14.

The override system 54, as shown in FIGS. 4 to 8, includes a worm gear 86 that is configured to be driven by a shaft 88. The override system 54 also includes a worm wheel 90 having teeth that engage corresponding threads of the worm gear 86, and a driving component 92. Here, the shaft 88 essentially functions as a secondary input that may be used to drive the gearbox 48 in the event that the motor 44 becomes non-operational. For example, an external force may be applied to the shaft 88 causing it to rotate the worm gear 86. The arrangement of the worm gear 86 and the worm wheel 90 is such that the rotation of the worm gear 86 causes the worm wheel 90 to rotate. In the illustrated embodiment, the worm wheel 90 is mechanically coupled to the driving component 92 such that the rotation of the worm wheel 90 also rotates the driving component 92. Thus, when operating the actuator 42 using the override system 54, the rotational motion of the driving component 92 drives the gearbox 48, which in turn drives the pinion 68 to raise or lower the rack 66 to bring the stem 52 to a desired position. As discussed above, in an offshore application, an ROV may be used to operate the override system 54. For example, while not shown in FIGS. 4 to 8, the shaft 88 may be further coupled to an adapter that may be engaged by a mechanical arm of an ROV to turn the shaft 88.

As best shown in FIGS. 5 and 6, the override system 54 further includes a locking system provided as ratchets 94 located on opposing ends of the worm gear 86. For example, a first ratchet 94A is located at the proximate end of the worm gear 86 (e.g., closest to the shaft), and a second ratchet 94B is located at the distal end of the worm gear 86 (e.g., furthest from the shaft). The ratchets 94A and 94B, which may include ratchet cams, pawls, and coupling members, function as a locking mechanism that allows for the worm gear 86 to be driven in response to a rotational input provided by the shaft 88, which may be a clockwise or counter-clockwise rotational motion with respect to the axis of rotation 96 when looking from the shaft 88 toward the distal-end ratchet 94B (as would be seen from the side elevational view of FIG. 4). However, the ratchets 94A and 94B also prevent the worm gear 86 from being back-driven by forces acting directly or indirectly upon the ring gear 92 (e.g., fluid pressures acting against the stem 52). That is, ratchets 94A and 94B allow for the worm gear 86 to be forward-driven by the shaft 88 (acting as the input) while preventing the worm gear 86 from being back-driven by the output components of the linear actuator 42.

Thus, the ratchets 94A and 94B may be considered as part of the anti-back-driving device 56 discussed above with reference to FIG. 3. By way of example only, in one embodiment, a worm gear 86 having the above-described anti-back-driving features may be a model of a MAXTORQUE™ worm gear available from Cameron International Corporation of Houston, Tex. While specific examples of devices that may be used as the anti-back-driving devices 46 and 56 have been provided herein, it should be understood that any suitable device capable of achieving the desired functionality (e.g., permitting forward-driving while preventing back-driving) may be used as the devices 46 and 56 of FIG. 3. For example, in one embodiment, both the anti-back-driving devices 46 and 56 may be of a model available from Cameron International Corporation. Moreover, in another embodiment, the anti-back-driving device 46 may similar to the illustrated anti-back-driving device 56 having the above-described worm gear 86, but may include a helical gear in place of a worm gear.

Figure 9:
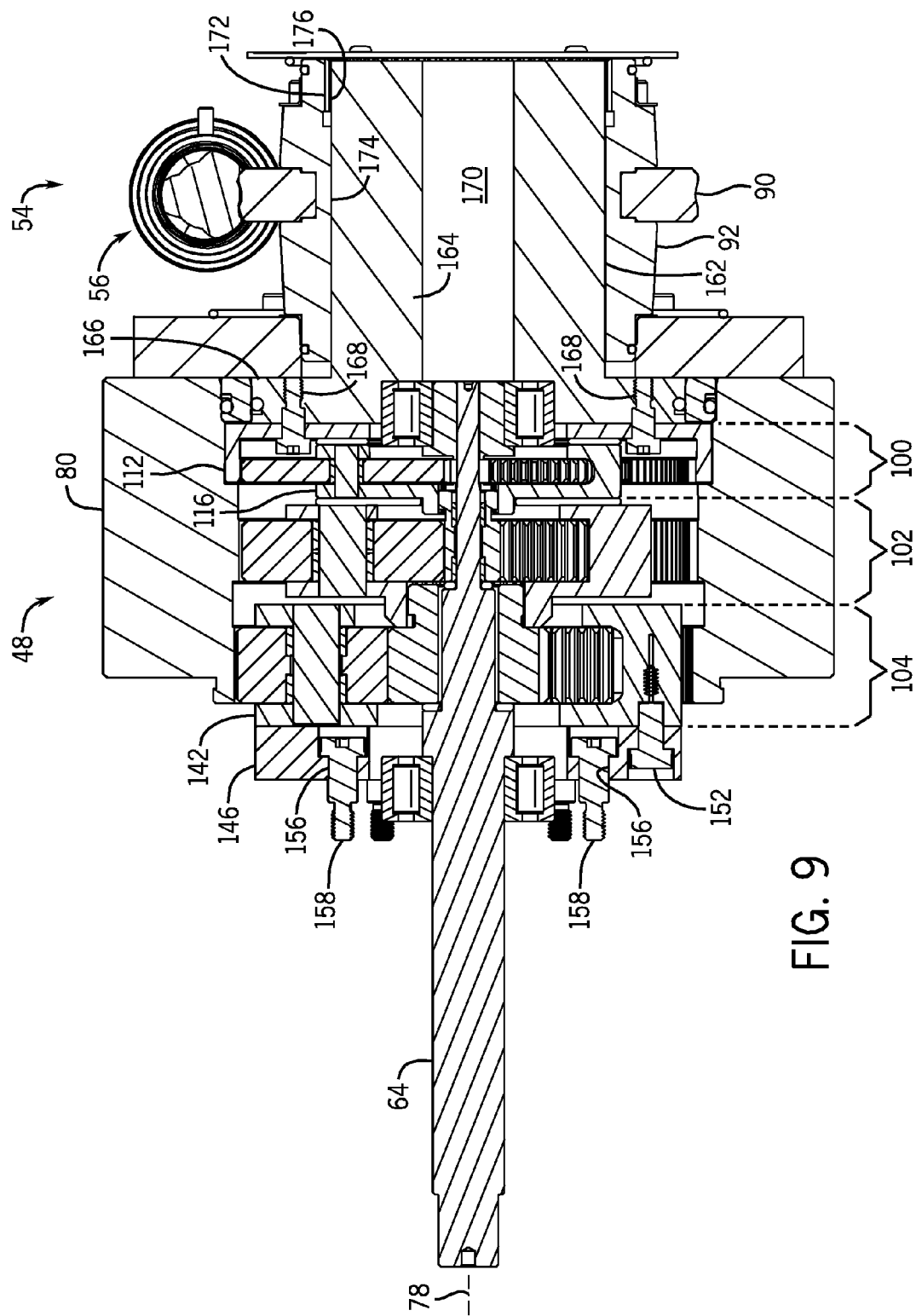
FIG. 9 is a partial cross-sectional view of the linear actuator, as shown in FIG. 8, illustrating a gearbox and override system of the linear actuator depicted in FIGS. 4 to 7 in more detail in accordance with one embodiment of the present disclosure.
Figure 10:
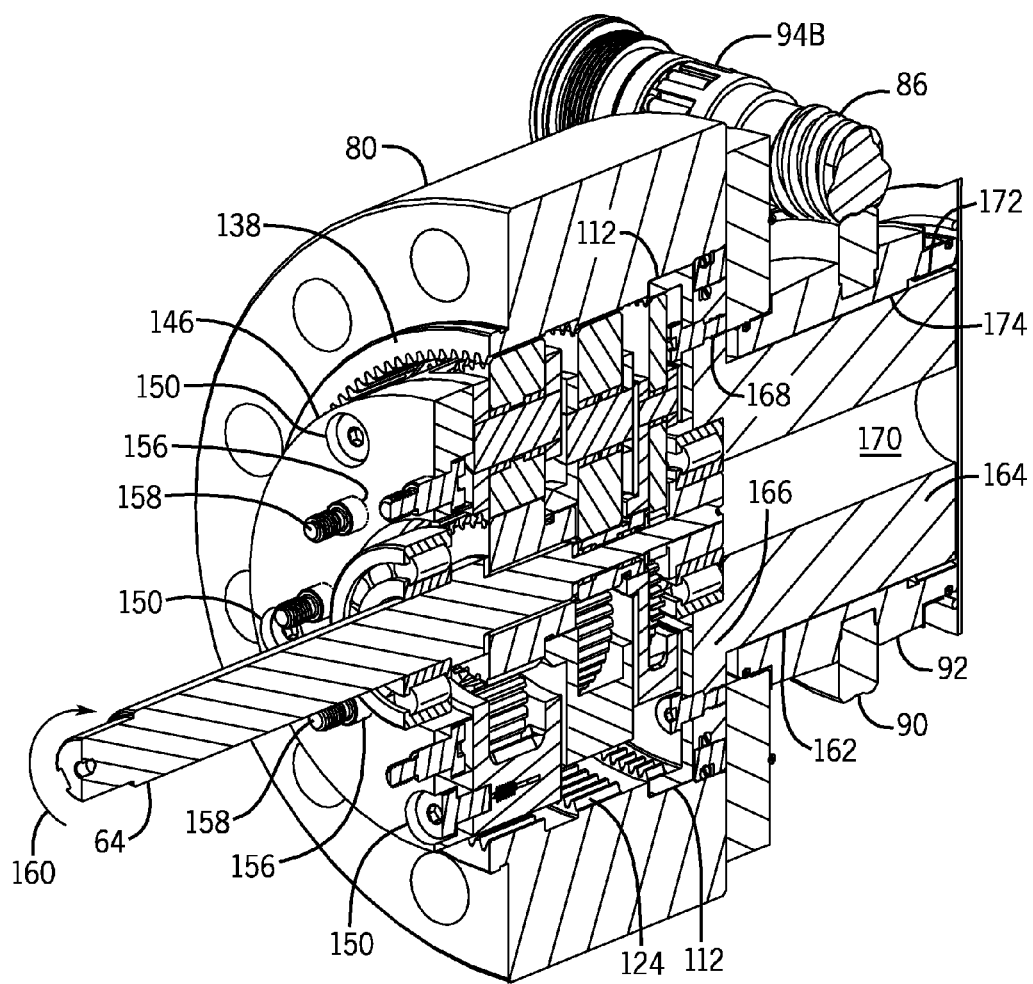
FIG. 10 is a perspective view of the gearbox and override system, as shown in FIG. 9.
Figure 11:
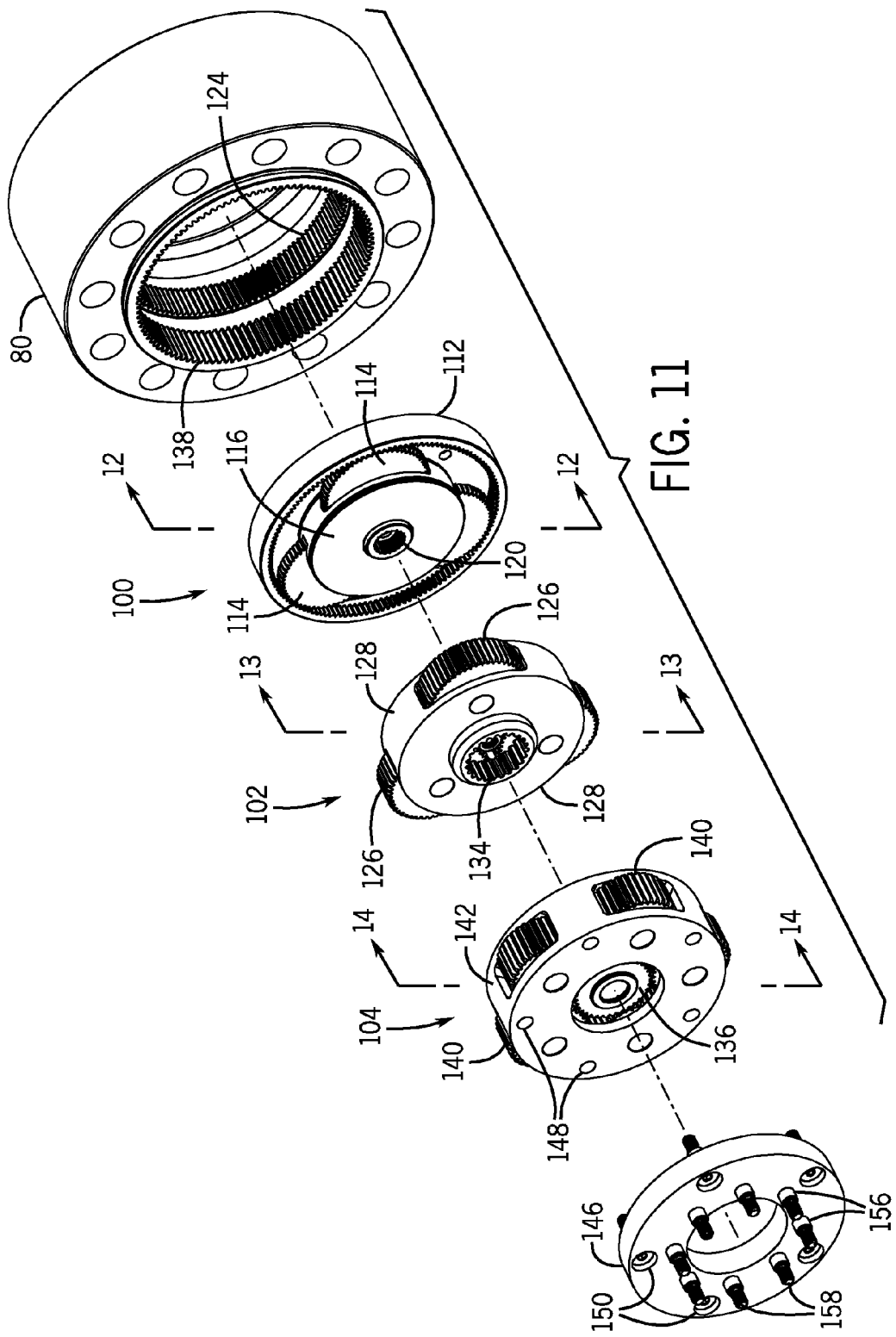
FIG. 11 is a perspective exploded view showing multiple gear sets of the gearbox depicted in FIGS. 9 and 10 in accordance with one embodiment of the present disclosure.
Figure 12:
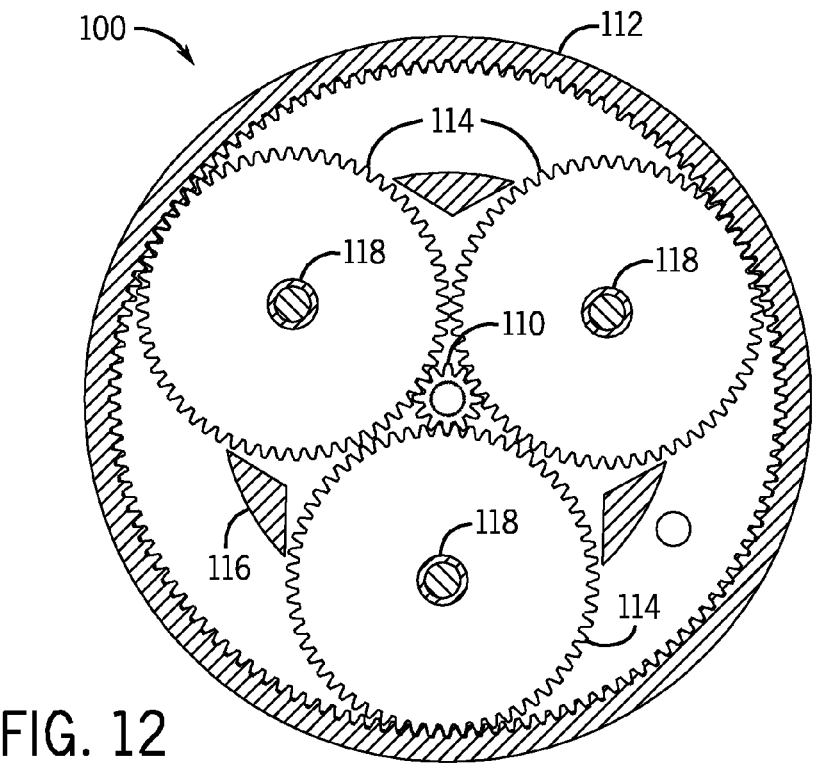
FIG. 12 is a cross-sectional view of a first gear set taken through cut-line 12-12 of FIG. 11 in accordance with an embodiment of the present disclosure.

While FIGS. 4 to 8 have provided a general overview of the override system 54, FIGS. 9 to 14 below will provide additional details of the override system 54 and the operation thereof not explicitly discussed above with reference to FIGS. 4 to 8. Referring now to FIGS. 9 to 14, the gearbox 48 and override system 54 of the linear actuator 42 are depicted in more detail. Specifically, FIG. 9 is an elevational cross-sectional view of the linear actuator 42 that is similar to that shown in FIG. 8 but with the focus being on the components of the gearbox 48 and the override system 54. FIG. 10 shows the same cross-section of FIG. 9, but in a perspective view. Moreover, FIG. 11 is a perspective exploded view showing individual gear sets of the gearbox 48. As can be seen in FIGS. 9 to 11, the gearbox 48 includes first, second, and third planetary gear sets referred to in the illustrated embodiment by reference numbers 100, 102, and 104, respectively. Further, FIG. 12 provides a cross-sectional view of the gear set 100 taken along cut-line 12-12 of FIG. 11, FIG. 13 provides a cross-sectional view of the gear set 102 taken along cut-line 13-13 of FIG. 11, and FIG. 14 provides a cross-sectional view of the gear set 104 taken along cut-line 14-14 of FIG. 11.

As discussed above, each gear set 100, 102, and 104 is a planetary gear set that generally includes a sun gear, a ring gear, planet gears disposed between the sun gear and ring gear, and a planet gear carrier. For example, as more clearly shown in FIG. 12, the first gear set 100 includes a sun gear 110, ring gear 112, planet gears 114, and carrier 116. The carrier 116 is mechanically coupled to the planet gears 114 by way of roller bearings 118 that enable the planet gears 114 to rotate independently of the carrier 116. The carrier 116 of the gear set 100 includes a spline 120 (best shown in FIG. 11) that is configured to engage a sun gear 122 of the second gear set 102.

In addition to the sun gear 122, the second gear set 102 includes a ring gear 124 that is disposed on the inside wall of the ring-shaped sleeve 80. When the gearbox 48 is assembled (shown best in FIGS. 9 and 10) the teeth of the ring gear 124 mesh with the teeth of planet gears 126 within the gear set 102. In the illustrated embodiment, the ring gear 124 may be integrally formed with the sleeve 80, such that the ring gear 124 always remains stationary with respect to the sleeve 80. Additionally, as will be discussed below, in some other embodiments, the ring gear 124 may be independently movable with respect to the sleeve 80. The second gear set 102 also includes a carrier 128 that is mechanically coupled to the planet gears 126 by way of roller bearings 130 that enable the planet gears 126 to rotate independently of the carrier 128. Further, the carrier 128 of the gear set 102 also includes a spline 134 that is configured to engage a sun gear 136 of the third gear set 104.

The third gear set 104 includes a ring gear 138, which, like the ring gear 124 of the second gear set 104, may be formed integrally with the inside wall of the sleeve 80. When the gearbox 48 is assembled (FIGS. 9 and 10) the teeth of the ring gear 138 mesh with the teeth of planet gears 140 of the gear set 104. The third gear set 104 also includes a carrier 142 that is mechanically coupled to the planet gears 140 by way of roller bearings 144, thus enabling the planet gears 140 to rotate independently of the carrier 142. While the sleeve 80 is depicted herein as being a standalone element, it should be understood that in some embodiments, the sleeve element 80 may be integrally formed as part of the housing 60. Thus, in such an embodiment, the sleeve 80 may not resemble a ring, but may be more of a round opening within the housing 60 in which the gear sets 100, 102, and 104 are disposed.

In the illustrated embodiment, a circular adapter plate 146 is coupled to the carrier 142. For instance, the carrier 142 includes a set of openings 148 that may align with a corresponding set of openings 150 on the adapter plate 146. Accordingly, coupling devices 152 are inserted through the openings 148 and 150 to couple to adapter plate 146 to the carrier 142. Such coupling devices 152 may include screws, bolts, or any suitable type of fastener. The adapter plate 146 also includes a second set of openings 156 for receiving another set of coupling devices 158. As best shown in FIGS. 9 to 11, the coupling devices 158 are provided as screws and arranged such that the threaded portion of each screw 158 extends axially away from the gearbox 48 (e.g., toward the motor 44). As will be appreciated, the adapter plate 146 and the coupling devices 152 and 158 mechanically couple the gearbox 48 to the pinion 68. Referring briefly back to FIG. 8, the coupling devices 158 may be received in corresponding openings on the pinion 68, thus coupling the pinion 68 to the gearbox 48 by way of the adapter plate 146. In this manner, a rotational output from the gearbox 48 will cause the pinion 68 to rotate, which raises or lowers the rack 66 depending on the direction of the rotation to control the position of the stem 52.

Having described the components of the gearbox 48 above, the operation of the gearbox 48 when being forward-driven by the motor 44 is described now in more detail. When referring to directions of rotation with regard to components of the gearbox 48, motor 44, and pinion 68, the terms clockwise and counter-clockwise are relative to the perspective of one facing the motor 44 (as would result in the front elevational view of FIG. 7) and looking out towards the gearbox 48. For instance, the clockwise direction is indicated in FIG. 10 by the directional arrow 160. As discussed above, the motor 44 provides a rotational input that drives the shaft 64, causing it to rotate about the rotational axis 78. The present embodiment may be one in which a clockwise rotational input provided by the motor 44 raises the stem 52 and a counter-clockwise rotational input lowers the stem 52. In other embodiments, an opposite configuration can be implemented as well, i.e., a counter-clockwise input raises the stem 52 and a clockwise input lowers the stem 52.

Here, a clockwise input from the motor 44 will cause the shaft 64 to turn in the clockwise direction 160. The shaft 64 is coupled to the sun gear 110 of the gear set 100, such that a clockwise rotation of the shaft 64 also turns the sun gear 110 clockwise. The ring gear 112 remains stationary when the gearbox 48 is being driven by the motor 44. Thus, as the sun gear 110 rotates in the clockwise direction, each of the planet gears 114 will each rotate about its respective roller bearing 118 in a counter-clockwise direction while orbiting the sun gear 110 in the clockwise direction. This causes the carrier 116 to rotate in the clockwise direction. Accordingly, when the gear set 100 is forward-driven using the motor 44, the sun gear 110 acts as an input and the carrier 116 provides a corresponding output to drive the adjacent gear set 102.

As discussed above, the carrier 116 has a spline 120 designed to engage the sun gear 122 of the second gear set 102. Thus, the clockwise rotation of the carrier 116 in the present example will cause the sun gear 122 to also turn clockwise. It should be noted that while the shaft 64 extends through an opening of the sun gear 122, as shown best in FIGS. 9 and 10, the shaft 64 is not directly coupled to the sun gear 122 and these components are able to rotate independently of each other, such as is the case when operating the gearbox 48 using the override system 54, as will be discussed further below.

The clockwise rotation of the sun gear 122 provides an input to the second gear set 102 that results in an output via the rotation of the carrier 128. For example, as the sun gear 122 rotates in the clockwise direction, the ring gear 124, which is integrally formed on the sleeve 80, remains stationary. As a result, each of the planet gears 126 will rotate about its respective roller bearing 130 in the counter-clockwise direction while orbiting the sun gear 122 in the clockwise direction. This causes the carrier 128 to rotate in the clockwise direction and drive the third gear set 104.

For instance, the spline 134 of the carrier 128 engages the sun gear 136 of the third gear set 104 and, therefore, the clockwise rotation of the carrier 128 causes the sun gear 136 to rotate in the clockwise direction. The ring gear 138, which is also integrally formed on the sleeve 80, remains stationary as the gearbox 48 is forward-driven via the motor 44. As a result, each of the planet gears 140 will rotate about its respective roller bearing 144 in the counter-clockwise direction while orbiting the sun gear 136 in a clockwise direction. This causes the carrier 142 to rotate in the clockwise direction. As discussed above, the carrier 142 is mechanically coupled to the adapter plate 146, which is further coupled to the pinion 68 as shown in FIGS. 9 and 10. Accordingly, a clockwise rotation of the carrier 142 will cause the pinion 68 to rotate in the clockwise direction. In the embodiment of the linear actuator 42 shown above in FIGS. 4 to 8, the rack 66 is arranged such that a clockwise rotation of the pinion 68 moves the rack 66 linearly upwards, thereby raising the stem 52.

As will be appreciated, a counter-clockwise rotational input from the motor 44 will cause the stem 52 to lower. For instance, the response of the various components of the gearbox 48 to a counter-clockwise rotational input will generally be opposite of the clockwise input response described above. For instance, a counter-clockwise rotation of the motor 44 will turn the shaft 64 and sun gear 110 counter-clockwise. As the ring gear 112 remains stationary, the planet gears 114 will rotate in a clockwise direction about their respective roller bearings 118 while orbiting the sun gear 110 in a counter-clockwise direction, thus causing the carrier 116 to rotate in the counter-clockwise direction. The components of the second gear set 102 and third gear set 104 may respond in a similar manner.

As discussed above, the gearbox 48 may be a reduction gearbox, such that the output directly driven by the gearbox 48, namely the pinion 68, rotates at a slower speed than the input shaft 64. Accordingly, each gear set 100, 102, and 104 may have a gear reduction ratio. For instance, in one embodiment, the gear sets 100, 102, and 104 may have gear reduction ratios of approximately 12:1, 8.8:1, and 4:1, respectively. This provides for a total gear reduction ratio of approximately 422:1. Those skilled in the art will appreciate that other gear reduction ratios may be implemented as well. For example, in other embodiments, the total gear reduction ratio may be between approximately 100:1 and 600:1, or may also be less than 100:1 or greater than 600:1. Additionally, while the embodiment depicted in FIGS. 9 and 10 includes a gearbox that has three planetary gear sets, it should be understood that other embodiments of the gearbox 48 may include more or fewer gear sets and may include gear sets of different designs to achieve a desired gear ratio.

With these points in mind, the additional components of the override system 54 are now described in greater detail. As discussed above with reference to FIGS. 4 to 8, the override system 54 includes a worm gear 86 that engages a worm wheel 90 formed on a driving component 92. For example, the worm gear may include helical threads that engage corresponding teeth on the worm wheel 90. As shown best in FIGS. 9 and 10, the override system 54 further includes an adapter component 162 that is coupled to the ring gear 112 of the gear set 100. The adapter 162 includes an annular-shaped portion 164 and a flange portion 166. The annular-shaped portion 164 is arranged coaxially with respect to the driving component 92, while the flanged portion 166 couples the adapter 162 to the ring gear 112 by way of one or more coupling devices 168, such as the threaded fasteners as shown in FIG. 9. While the portion 164 is annular in shape, as indicated by the central opening 170, in other embodiments, the opening 170 may be omitted, and the portion 164 of the adapter 162 may be cylindrical.

In the illustrated embodiment, the driving component 92 includes a set of splines 172 arranged parallel to the axis of rotation 78 and circumferentially along at least a portion of an inside wall 174 of the driving component 92. The splines 172 may mesh with corresponding grooves 176 located on the adapter 162. Thus, rotational force applied to the driving component 92 will transfer torque to the adapter 162 and cause it to rotate. Further, as the adapter 162 is coupled to the gearbox 48 by way of the coupling devices 168, the rotation of the adapter 162 may drive the gearbox 48 to raise or lower the stem 52 when the linear actuator 42 is being forward-driven using the override system 54.

As mentioned above, the linear actuator 42 may be operated using the override system 54 in situations where the motor 44 becomes non-operational. For instance, where the motor 44 is an electric motor, the motor 44 may become non-operational due to electrical malfunction of the motor 44 or due to power loss. In such conditions, the override system 54 may be operated by applying a rotational force to an input shaft 88 (best shown in FIGS. 5 and 6). In the present embodiment, the override system 54 may be designed such that a clockwise rotational input provided by the shaft 88 raises the stem 52 and a counter-clockwise rotational input lowers the stem 52. Of course, in other embodiments, the opposite configuration can be implemented as well, i.e., a counter-clockwise input from the shaft 88 raises the stem 52 and a clockwise input lowers the stem 52.

When referring to directions of rotation with respect to the shaft 88 and the worm gear 86, the terms clockwise and counter-clockwise are relative to the perspective of one looking down the shaft 88 towards the worm gear 86 (e.g., as would result in the side elevational view shown in FIG. 4). Directions of rotation referring to the worm wheel 90, driving component 92, adapter 162, and components of the gearbox 48 will be from the same perspective noted above (e.g., one facing and looking at the motor from a front-elevational view, i.e., FIG. 7).

With this in mind, assuming the shaft 88 is rotated clockwise, this clockwise rotational input will turn the worm gear 86 in the clockwise direction. The engagement of the threads of the worm gear 86 and the teeth of the worm wheel 90 will cause the worm wheel 90 to rotate. As will be appreciated, the direction of the rotation of the worm wheel 90 in response to a clockwise input may depend on the configuration of the threads on the worm gear 86. In the present example, it may be assumed that a clockwise rotation of the worm gear 86 about the axis 96 will cause the worm wheel 90, as well as the driving component 92 to which it is coupled, to rotate in the clockwise direction about the axis 78.

Due to the mating of the splines 172 of the driving component 92 and the grooves 176 on the adapter 162, the rotation of the driving component 92 will transfer torque to the adapter 162, causing it to also rotate in the clockwise direction about the axis 78. As the adapter 162 turns clockwise, the ring gear 112 of the gear set 100 to which the adapter 162 is coupled will also turn in the clockwise direction. Further, since the motor 44 is not operational when operating the linear actuator 42 in the override mode, the sun gear 110 will remain generally stationary. Accordingly, the planet gears 114 will rotate about their respective roller bearings 118 in the counter-clockwise direction while orbiting the sun gear 110 in a clockwise direction, thus causing the carrier 116 to rotate in the clockwise direction. Thus, in the override mode, the ring gear 112 of the first gear set 100 acts as an input while the carrier 116 provides an output.

The remainder of the gearbox 48 may operate in the same manner discussed above with regard to a forward-driving input from the motor 44. That is, since the output of the first gear set 100 in response to a clockwise input from either the motor 44 or the override system 54 is the same (e.g., the carrier 116 rotates in the clockwise direction in either case), the response of the gear sets 102 and 104 will be generally identical with respect to direction, although the rotational speeds may differ. Thus, with the understanding that the gear sets 102 and 104 will respond in the same manner described above, the clockwise input from the shaft 88 of the override system 54 will result in the pinion 68 turning in the clockwise direction and causing the rack 66 to raise the stem 52. Further, based on the present example, it should be understood that if the shaft 88 is driven in the opposite direction (e.g., counter-clockwise), the gearbox 48 operate generally the same way, but with an opposite directional response that results in the stem 52 being lowered. Moreover, though not explicitly shown herein, the various components of the gearbox 48 and the rack 66 and pinion 68 may be provided with integral mechanical bearings with low friction materials to reduce efficiency losses.

While the embodiment illustrated in FIGS. 4 to 10 shows the override system 54 as being generally separate from but located adjacent to the gearbox 48, other embodiments of the override system 54 may be at least partially integrated with the gearbox 48. For example, in one embodiment, the override system 54 may directly drive a worm wheel located in the gearbox 48. Such a worm wheel may be formed with one of the ring gears, such as ring gear 124 of the gear set 102. In such an embodiment, the ring gear 124 is formed as a set of inner teeth, with a set of outer teeth on the outside diameter of the ring gear 124 forming the worm wheel. Here, the worm gear 86 (or, alternatively, a helical gear) may be positioned so that its threads mesh with the worm wheel, while the inner teeth forming the ring gear 124 mesh with the planet gears 126 of the gear set 102 as described above. Additionally, the ring gear element 124 in such an embodiment would not be integrally formed on the sleeve 80 so as to permit rotation of the ring gear 124 when the override system 54 is being used to control the actuator 42.

When operating an override system 54 designed in this manner, the shaft 88 may turn the worm gear 86. For instance, assuming a clockwise rotational input is provided by the shaft, the worm gear 86 will turn clockwise as well. This will cause the ring gear 124 to rotate. Because the first gear set 100 does not receive an input in such an embodiment (e.g., the motor 44 is not driving the sun gear 110), the carrier 116 remains stationary, as does the sun gear 122 of the gear set 102. Assuming the ring gear 124 rotates in the clockwise direction in response to a clockwise input from the shaft 88, the planet gears 126 will rotate in the counter-clockwise direction about their respective roller bearings 130 while orbiting the sun gear 122 in the clockwise direction, thereby rotating the carrier 128 in the clockwise direction. As discussed above, a clockwise output from the second gear set 102 will drive the third gear set 104 such that the carrier 142 rotates in the clockwise direction. This turns the pinion 68 in the clockwise direction and causes the rack 66 to move in a linear direction that raises the stem 52.

While the above example assumes that the worm gear 86 of the override system 54 is positioned to engage the ring gear 124, other embodiments of the override system 54 may position the worm gear 86 such that it engages the ring gear 112 or the ring gear 138. Further, in some embodiments, the override system 54 may include devices other than a worm gear 86 to drive the gearbox 48. For instance, in other embodiments, other types of gearing devices, such as helical gears or spur gears, may be used.

As also discussed above, the anti-back-driving devices 46 and 56 of the linear actuator 42 provide a self-locking mechanism in which the actuator 42 is permitted to be forward-driven by either input, i.e., the motor 44 or the override system 54, although typically only one input is operational at a given time. However, the anti-back-driving devices 46 and 56 also prevent the motor 44 and the override system 54, respectively, from being back-driven, such as due to fluid pressures acting against the stem 52. For example, fluid pressures acting against the stem 52 may generate forces that would otherwise raise the stem without the anti-back-driving devices 46 and 56 in place. For instance, the anti-back-driving device 46 is positioned between the motor 44 and the shaft 64. This allows torque provided by the motor 44 to transfer to the shaft 64 when forward-driving the actuator 42 via the motor 44. However, when the motor 44 is not driving the shaft 64, the anti-back-driving device 46 locks the shaft 64 in a generally stationary position to prevent torque from being transferred back to the motor 44. It should be noted that this also maintains the sun gear 110 to which the shaft 64 is coupled in a generally stationary position.

With regard to the anti-back-driving device 56 on the override system 54, the device 56 allows for the worm gear 86 to be forward-driven by the shaft 88. However, torque from the adapter 162, driving component 92, and/or worm wheel 90 are not permitted to transfer to the worm gear 86. That is, when the actuator 42 is not being forward-driven by the override system 54, the adapter 162, driving component 92, and worm wheel 90 are generally stationary and non-rotating. Further, because the adapter 162 is mechanically coupled to the ring gear 112, the ring gear 112 is held generally stationary. Accordingly, because the ring gear 112 and the sun gear 110 of the gear set 100 are held generally stationary when neither input is driving the actuator 42, the gearbox 48 is essentially locked in that the remaining gear sets are held in a generally stationary position. This essentially locks the position of the pinion 68, which maintains the rack 66 at its current position and prevents the stem 52 from moving.

Due to this self-locking design, the actuator 42 may be said to have a fails-as-is configuration. That is, if either or both inputs (motor 44, override 54) of the actuator 42 were to fail, the stem 52 will be maintained at its last position prior to such failure by virtue of the arrangement of the anti-back-driving devices 46 and 56, and will not move to a random position in response to fluid pressure. In other configurations, the actuator 42 may also be designed to have a fails-open or fails-closed configuration. For instance, in such embodiments, the actuator 42 may include a mechanism on at least one of the inputs that may release a spring-loaded device that is designed to either fully open (fails-open) or fully close (fails-closed) the stem 52. In one embodiment, the mechanism may be configured such that it is tripped when power loss (e.g., loss of electric power for an electric motor or loss of hydraulic pressure for a hydraulic motor) is detected rendering the motor 44 non-operational. Because this spring-loaded device is applied on the input side, the actuator 42 will respond to such input without self-locking. By way of example only, in one embodiment, the spring-loaded device may include a gate valve.

As discussed above with reference to FIG. 3, the linear actuator 42 includes a housing 60. FIGS. 15 and 16 show such a housing 60 in accordance with one embodiment. The illustrated housing 60 includes the motor housing portion 61 and the gearbox housing portion 62 shown in FIG. 3. The housing portion 61 houses the motor 44, while the housing portion 62 houses the gearbox 48 and the other components of the actuator 42. For example, the housing portion 62 includes a portion 184 that houses the rack 66 and a portion 186 that houses the override system 54. An adapter 188 is mechanically coupled to the housing portion 62 (by way of the portion 186) and may be manipulated using an arm of an ROV. For example, an ROV may turn the adapter 188 to drive the shaft 88 of the override system 54.

A position sensor 58 is shown as being exposed from the housing 60 for illustrative purposes. That is, normally, the portion 184 may extend to also enclose the sensor 58. The sensor 58 may be a linear variable differential transformer or any suitable type of device for measuring linear displacement. Accordingly, the position of the stem 52 may be provided to the SCM 24. For instance, the sensor 58 may be coupled to a data cable 190 that terminates at a connector 192. This connector 192 may couple to another data cable (not shown) that electrically couples the sensor 58 to the SCM 24 or other control equipment. Further, in some embodiments, a local position indicator 59 (FIG. 3) may include a visual position indicating device that is provided in conjunction with the sensor 58. For instance, such a device may include a local indicator, such as a dial with a suitable scale that converts linear motion into rotary motion.

In the present embodiment, the motor housing 61 may be fastened to the gearbox housing 62 using a number of fastening devices 194. That is, when assembled, the motor housing 61 and gearbox housing 62 may form separate enclosures. Referring to FIG. 16, in which the motor housing 61 is removed, the fastening devices 194 from FIG. 15 may extend through the motor housing 61 and engage openings 196 on the gearbox housing 62. In one embodiment the fastening devices may be threaded devices, such as screws or threaded bolts, that engage corresponding threads in the openings 196.

As discussed above with reference to FIG. 3, the motor housing 61 may contain a lubricating fluid, such as gear oil, of relatively light viscosity. This allows for the motor 44 to operate well in high pressure and low temperature environments, as is typically the case in subsea applications. The gearbox housing portion 62 may contain a higher viscosity gear oil relative to that of the motor housing 61. To equalize pressure between the low viscosity gear oil and the high viscosity gear oil, a volume compensation bladder 63 is provided as a pressure equalization device, as shown in FIG. 16. This embodiment may help minimize viscosity changes that may occur at the motor 44 due to extreme temperature and pressure environments, making the actuator 42 well-suited for use in a wide range of operating conditions. Moreover, in the case of an electric motor, the presently illustrated design helps to minimize the leak path to the water-sensitive electric motor and associated electronics. Further, in an embodiment where the actuator 42 is designed to be used in a subsea application, another pressure equalization device (e.g., 65) may be provided on the gearbox housing portion 62 to equalize pressure between the high viscosity gear oil and sea water.

The embodiments described herein provide for a highly efficient actuator design that is capable of being powered using existing subsea electronic control systems (e.g., without requiring a separate dedicated power supply). For instance, in embodiments that include an electric motor, the motor 44 may operate on as little as 48 watts or less of electric power while achieving a full stroke (e.g., 2 to 4 inches or more) of the stem 52 within a time period of between approximately 5 and 10 minutes. As can be appreciated, 48 watts may correspond to the nominal power output provided by certain conventional subsea electronic control systems. By way of example only, in one embodiment, when operating on 48 watts of power, the motor 44 may achieve a full stroke of approximately 2.25 inches within approximately 6 minutes. Further, the high operating efficiency of the illustrated actuator 42 may allow it to operate against a wide range of pressures. For instance, the actuator 42 may be capable of a dynamic thrust load of 20,000 pounds or more and a static load of 30,000 pounds or more.

Moreover, the linear actuator 42 may have a footprint that is generally smaller and compact compared to some types of existing actuators. For instance, in one embodiment, the linear actuator 42 may have a height of approximately 15 to 20 inches, a length of approximately 20 to 25 inches, and a depth of approximately 15 to 20 inches. Such dimensions may allow the actuator 42 to have a footprint that is approximately half that of some existing actuators.

While the aspects of the present disclosure may be susceptible to various modifications and alternative forms, specific embodiments have been shown by way of example in the drawings and have been described in detail herein. But it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A linear actuator comprising:
   a motor configured to provide a rotational input for turning a shaft;
   a gearbox that is mechanically coupled to the shaft and provides a rotational output when driven by the shaft;
   a pinion that is mechanically coupled to the gearbox and rotates in response to the rotational output of the gearbox;
   a rack coupled to a load, wherein the rack causes the load to move linearly in response to the rotation of the pinion;
   an override system capable of driving the gearbox to generate the rotational output when the motor is non-operational; and
   a housing that houses the motor, gearbox, pinion, rack, and override system, wherein the housing comprises a first housing portion containing the motor and a second housing portion containing the gearbox, wherein the first and second housing portions form separate respective enclosures, the first housing portion contains a first lubricating fluid having a first viscosity, and the second housing portion contains a second lubricating fluid having a second viscosity, the first viscosity being less than the second viscosity.

2. The linear actuator of claim 1, comprising
   a first anti-back-driving device disposed between the motor and shaft to prevent back-driving of the motor; and
   a second anti-back-driving device disposed between the override system and the gearbox to prevent back-driving of the override system.

3. The linear actuator of claim 2, wherein the linear actuator is configured such that, when neither the motor nor the override system is driving the gearbox, the load is maintained in its current position.

4. The linear actuator of claim 1, comprising a compensation bladder that equalizes pressure between the first and second lubricating fluids.

5. The linear actuator of claim 1, comprising a position indicator sensor that senses the linear position of the load.

6. The linear actuator of claim 5, wherein the position indicator sensor comprises a linear variable differential transformer.

7. The linear actuator of claim 1, comprising a local position indicator coupled to the load that converts linear motion of the load into rotary motion to indicate the position of the load.

8. The linear actuator of claim 1, wherein the load comprises a stem of a valve, and wherein the linear actuator is configured such that, in operation, the linear motion raises or lowers the stem to vary a flow rate through the valve.

* * * * *